United States Patent
de Queiroz et al.

(10) Patent No.: US 6,778,301 B2
(45) Date of Patent: Aug. 17, 2004

(54) FAST PREVIEW OF CCITT-COMPRESSED DOCUMENTS

(75) Inventors: Ricardo L. de Queiroz, Pittsford, NY (US); Reiner Eschbach, Webster, NY (US)

(73) Assignee: Xerox Corporation, Stamford, CT (US)

( * ) Notice: Subject to any disclaimer, the term of this patent is extended or adjusted under 35 U.S.C. 154(b) by 758 days.

(21) Appl. No.: 09/731,130

(22) Filed: Dec. 6, 2000

(65) Prior Publication Data

US 2002/0101606 A1 Aug. 1, 2002

(51) Int. Cl.[7] .............................. H04N 1/41; H04N 1/32; G06K 9/46
(52) U.S. Cl. ............. 358/539; 358/426.01; 358/426.04; 358/426.11; 382/232
(58) Field of Search ................................ 382/232, 233, 382/234, 237, 244, 248; 358/1.2, 539, 426.04, 426.01

(56) References Cited

U.S. PATENT DOCUMENTS 4,772,955 A * 9/1988 Kurahayashi et al. .. 358/426.01

* cited by examiner

Primary Examiner—Edward Coles
Assistant Examiner—Jason Sherrill
(74) Attorney, Agent, or Firm—Fay, Sharpe, Fagan, Minnich & McKee, LLP

(57) ABSTRACT

A method of deriving a preview image from CCITT-compressed digital image data that represent an original image is disclosed. The method comprises receiving CCITT-compressed image data that represent an original image having Nr rows and Nc columns. Without decompressing the CCITT-compressed data, a preview image is derived that has Nr/M rows each having Nc/M pixel values. The reducing step includes processing each group of M rows of said original image represented in the CCITT-compressed data. Specifically, the CCITT-compressed data that represent the group of M rows of the original image is read. For each constituent row in the group of M rows, a location in the row is derived for each transition represented in the CCITT-compressed data. For each constituent row in the group of M rows, each transition in the row is mapped to a pixel value in a reduced row having Nc/M pixel values. Therefore, for each group of M rows in the original image, M reduced rows are defined. In each case, the M reduced rows are combined by averaging or the like into a single preview row having Nc/M preview pixel values. The preview image is assembled from Nr/M preview rows.

15 Claims, 7 Drawing Sheets

FAST PREVIEW OF CCITT-COMPRESSED DOCUMENTS

BACKGROUND OF THE INVENTION

The present invention relates to the digital image processing arts. More particularly, the present invention relates to the preview of binary images compressed according to the CCITT standard without requiring complete decompression of the CCITT-compressed data, i.e., processing is performed in the CCITT-compressed domain. This allows for highly efficient generation of downsampled images such as thumbnail or other preview images.

Binary images of documents are often compressed using the CCITT standard. This is true, for example, in image printing and xerographic document reproduction apparatus. Presently, if one desires to preview/edit the image on a computer monitor or generate a thumbnail image of the compressed image, one is required to fully decompress the image data and perform processing to generate the preview image or thumbnail image in the decompressed domain. For example, a decompressed image defined at a resolution of 600 dots per inch (dpi) in both directions can be reduced or downsampled by a factor of 20 (i.e., to a resolution of 30 dpi×30 dpi) by replacing each block of 20×20 pixels with the average of same. This is highly inefficient in terms of required processing time and resources.

SUMMARY OF THE INVENTION

In accordance with the present invention, a method for fast preview of CCITT-compressed digital images is provided. According to a first aspect of the invention, a method of deriving a preview image from CCITT-compressed digital image data that represent an original image is provided. The method comprises receiving CCITT-compressed image data that represent an original image having Nr rows and Nc columns so that the original image has a resolution of Nr×Nc. The image is reduced by factors of M1 and M2 along respective first and second axes to derive a preview image having Nr/M1 preview rows each having Nc/M2 pixel values so that the preview image has a resolution of Nr/M1×Nc/M2. The reducing step comprises, for each group of M1 rows of the original image: (i) reading the CCITT-compressed data that represent the group of M1 rows of the original image; (ii) for each constituent row in the group of M1 rows, deriving a location in the row for each transition represented in the CCITT-compressed data; (iii) for each row in the group of M1 rows, mapping each transition in the row to a pixel value in a reduced row having Nc/M2 pixel values whereby M1 reduced rows are defined; and, (iv) deriving a single preview row having Nc/M2 preview pixel values based upon the M1 reduced rows.

One advantage of the present invention resides in the provision of a method for fast preview of CCITT-compressed documents.

Another advantage of the present invention is found in the provision of a method for fast preview of CCITT-compressed documents that is faster than prior art methods and that utilizes less memory and other processing resources.

A further advantage of the present invention is the provision of a method for fast preview of CCITT-compressed documents wherein downsampling in the slow scan direction (inter-row) takes place after downsampling in the fast scan direction (intra-row) whereby the former operation is not computationally intensive.

Still other benefits and advantages of the invention will become apparent to those of ordinary skill in the art to which the invention pertains upon reading and understanding the following specification.

BRIEF DESCRIPTION OF THE DRAWINGS

The invention comprises various steps and arrangements of steps, preferred embodiments of which are illustrated in the accompanying drawings that form a part hereof and wherein.

DETAILED DESCRIPTION OF PREFERRED EMBODIMENT

CCITT compression is well known and in common use to compress binary digital image data such as black-and-white digital image data. The invention is described herein with reference to black-and-white image data for ease of understanding the invention. However, those of ordinary skill in the art will recognize that the invention can be implemented for fast preview of any color binary digital image data, i.e., for fast preview of any digital image defined by a plurality of pixels wherein each pixel is defined as having one of two possible colors.

Figure 1:
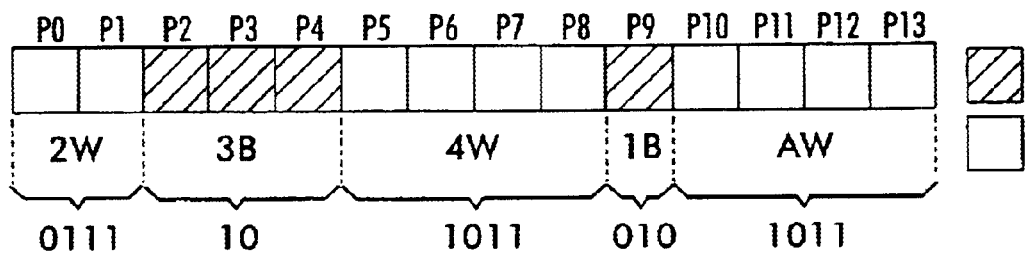
FIGS. 1 and 2 diagrammatically illustrate conventional CCITT compression for digital image data.

FIG. 1 illustrates a row or scanline of binary digital image data. The row is defined in terms of a plurality of pixels P0–P13, wherein each pixel has one of two values representing two colors, respectively. Here, for example, each pixel P0–P13 is defined as having a value 0 or 255 representing black and white or off and on, respectively. CCITT compression (T.4/Group 3) is based upon run-lengths of the pixel colors on a scanline by scanline basis. Commonly occurring run-lengths are assigned short codes while less common run-lengths are assigned longer codes. Thus, typical digital image data (e.g., a page of facsimile image text data) can be significantly compressed using CCITT codes. In the present example, the run-lengths are 2 white (2W), 3 black (3B), 4 white (4W), 1 black (1B), and 4 white (4W) and, thus, the line can be represented in the CCITT-compressed domain as 01111010110101011. Typically compression ratios of 10:1 can be achieved in connection with typewritten text. In an alternative CCITT-compression scheme (T.6/Group 4), where possible, a scan line is encoded based upon its relationship to the previously encoded line. This implementation can achieve even higher compression ratios owing to the fact that very common pixel locations relative to the previous line can be encoded with a single bit.

Figure 2:
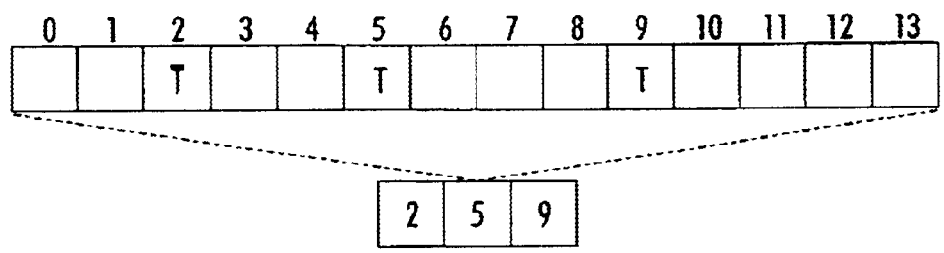

Referring now to FIG. 2, without regard to the particular variation of CCITT compression employed, it is known that the CCITT-compressed data represent "transitions" in either direction from one of the two possible colors to the other of the two possible colors in a scanline or other row of pixels values. In the present example, color changes occur at pixels 2, 5, 9 in the row R, i.e., at the third, sixth, and tenth pixels.

Figure 3:
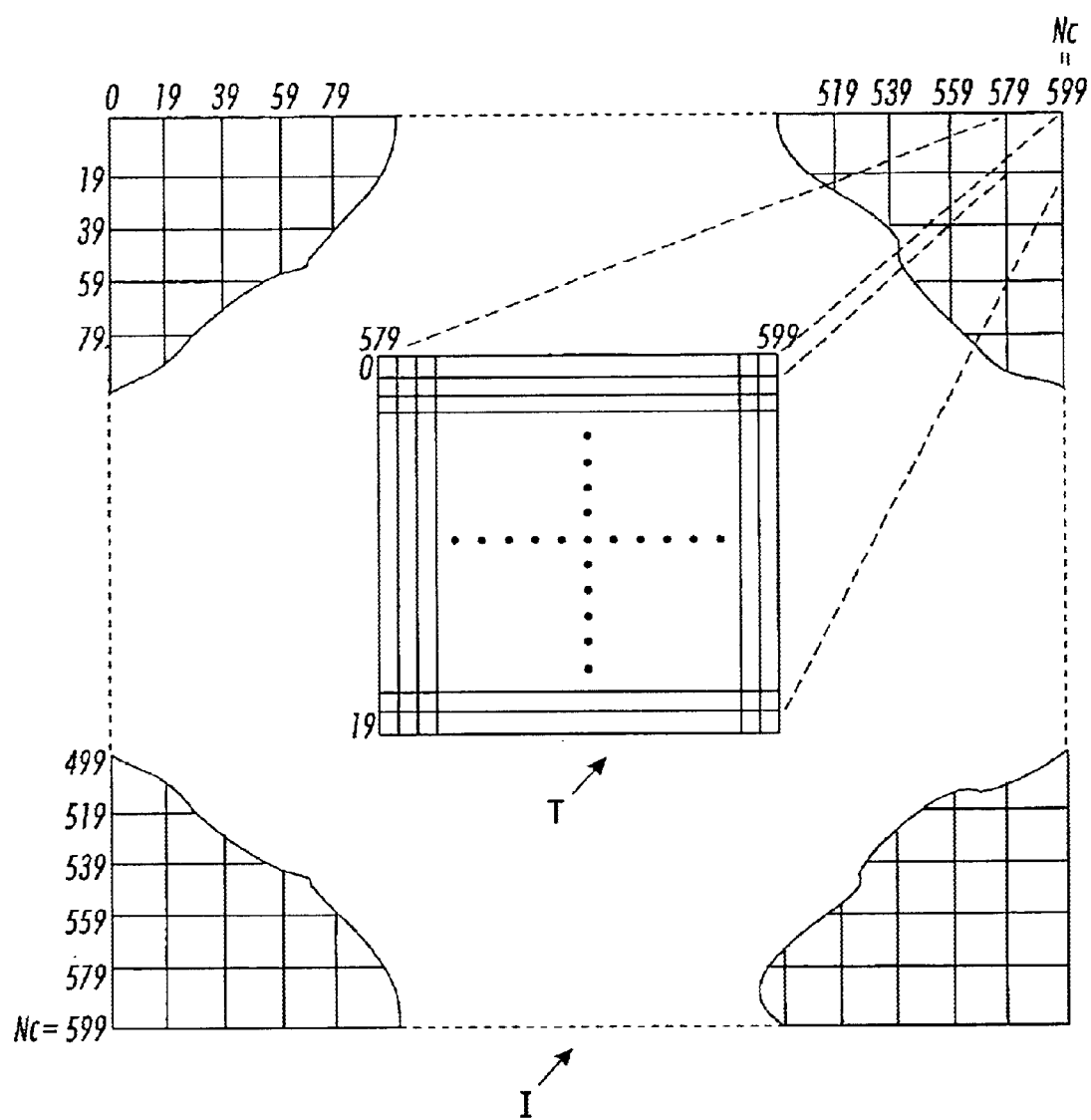
FIG. 3 diagrammatically illustrates a 600 pixel×600 pixel digital image and conventional downsampling or reduction of same by a factor of 20.

FIG. 3 illustrates a binary digital image I defined in terms of Nr=600 rows R and Nc=600 columns. In a conventional reduction method, to reduce the image I by a factor of M=20 would require the image to be divided into a plurality of 20×20 pixel tiles T, with the 400 pixel values defining each tile reduced to a single pixel value by averaging or the like. The resulting image would be defined in terms of 30×30 pixels. Furthermore, if the image is compressed according to the CCITT standard, this conventional reduction method requires that the image be completely decompressed prior to the reduction process. This is highly inefficient in terms of time and processing resources required.

Figure 4:
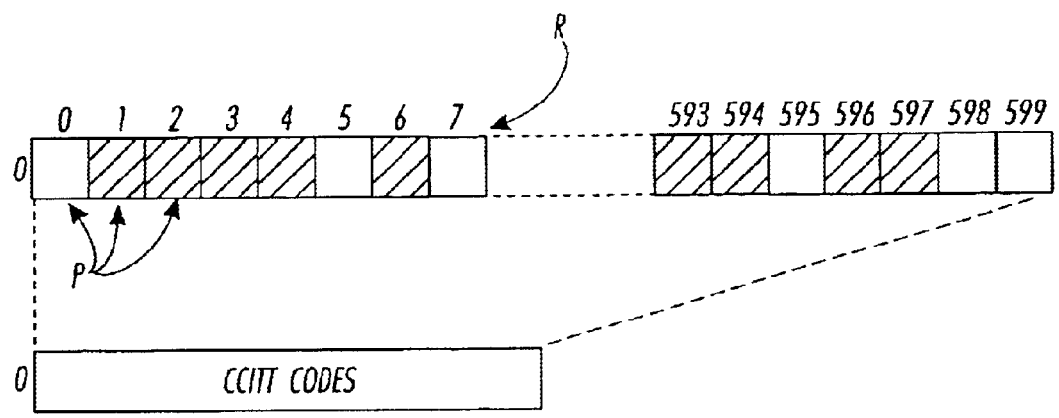
FIG. 4 diagrammatically illustrates a single row of pixels from the image of FIG. 3 and corresponding CCITT-compressed data that represent the single row of image data.
Figure 5:
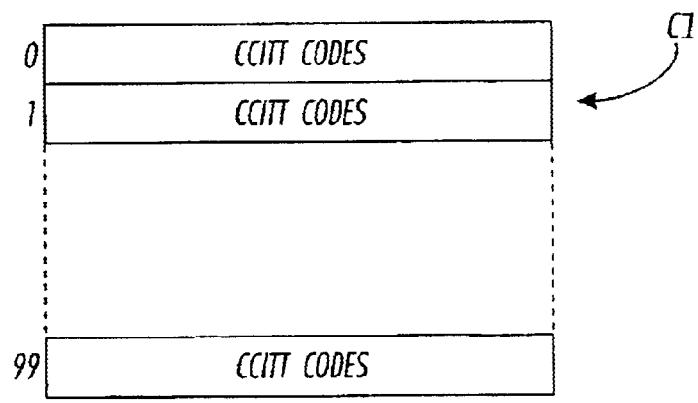
FIG. 5 diagrammatically illustrates the entire image of FIG. 3 in CCITT-compressed form.

As illustrated in FIG. 4, each scanline or row R of pixel P of the image I can be encoded as codes in the CCITT domain for compression purposes. Therefore, as shown at CI in FIG. 5, the entire image I is represented in the CCITT-compressed domain by a CCITT-compressed data representing the 600 rows (R0–R599) of the image I. In accordance with the present invention, the CCITT-compressed image CI is reduced in the CCITT-compressed domain, i.e., without decompressing the data, to generate a preview image.

Figure 6:
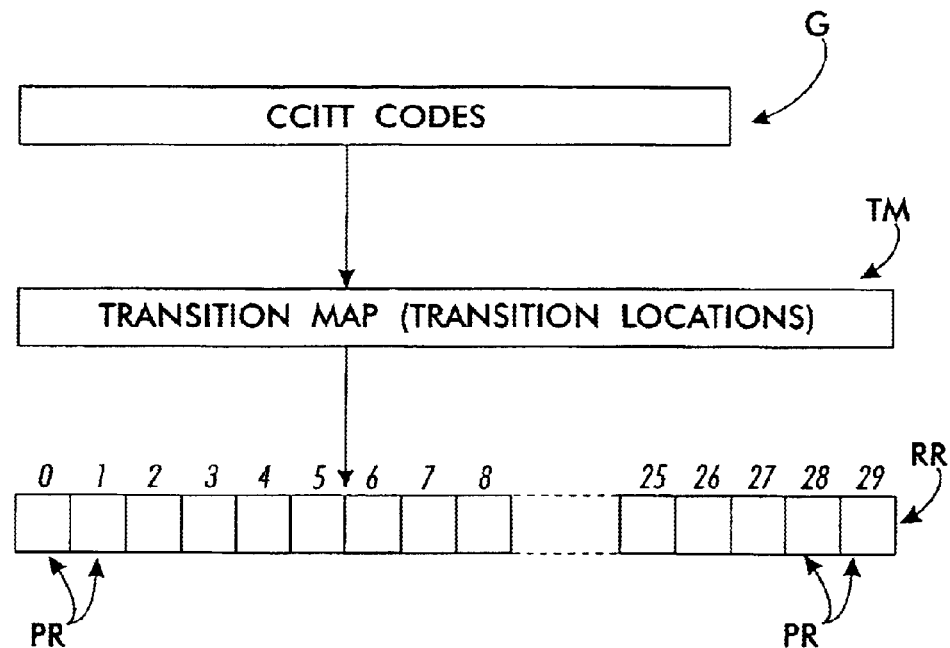
FIGS. 6 and 7 are simplified diagrams that represent the fast preview method of the present invention wherein CCITT-compressed data are used to develop a transition map, and wherein the transition map is used to develop pixel values for a reduced image such as a thumbnail image.
Figure 7:
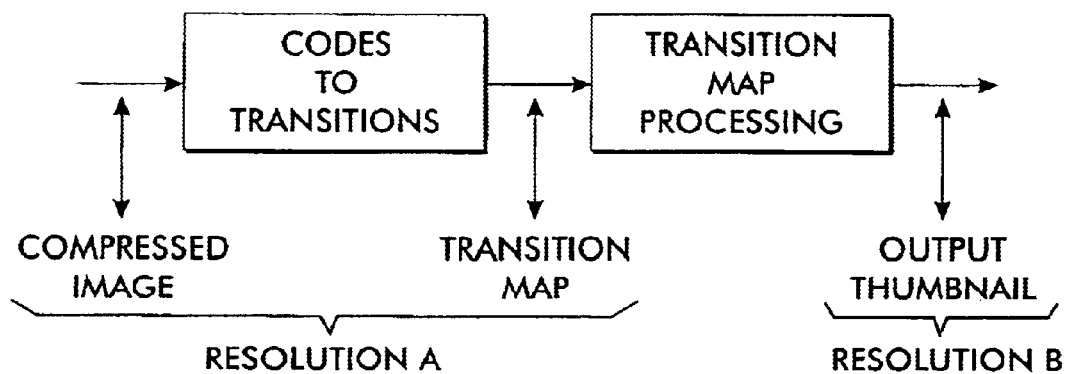

Turning now also to FIGS. 6 and 7, a method for fast preview of CCITT-compressed digital images in accordance with the present invention is generally disclosed. The fast preview method comprises receiving data defining a CCITT-compressed image CI that represents a digital image I having a first resolution "A." For each group G of CCITT-compressed data that represents a row R0–R599 of the image I, a transition map TM is derived. The transition map TM provides information concerning the location of each transition that occurs in the corresponding row R0–R599 of the uncompressed image I. The transition map TM is then processed to derive pixel values for each pixel PR of a reduced row RR. The number of pixels PR in each reduction row RR depends upon the reduction factor M by which the image I is to be reduced in two dimensions. Finally, groups of reduced rows RR are combined into respective preview rows that define a preview image at a lower resolution "B" relative to the resolution "A" of the original image I. Here, again, the number of reduced rows RR that are combined to derive each preview row depends upon the reduction factor M. It is important to note that the CCITT-compressed data are not decoded at any stage; they are merely read and processed in the CCITT-compressed domain to derive the transition map TM for each row of the input image I.

Figure 8:
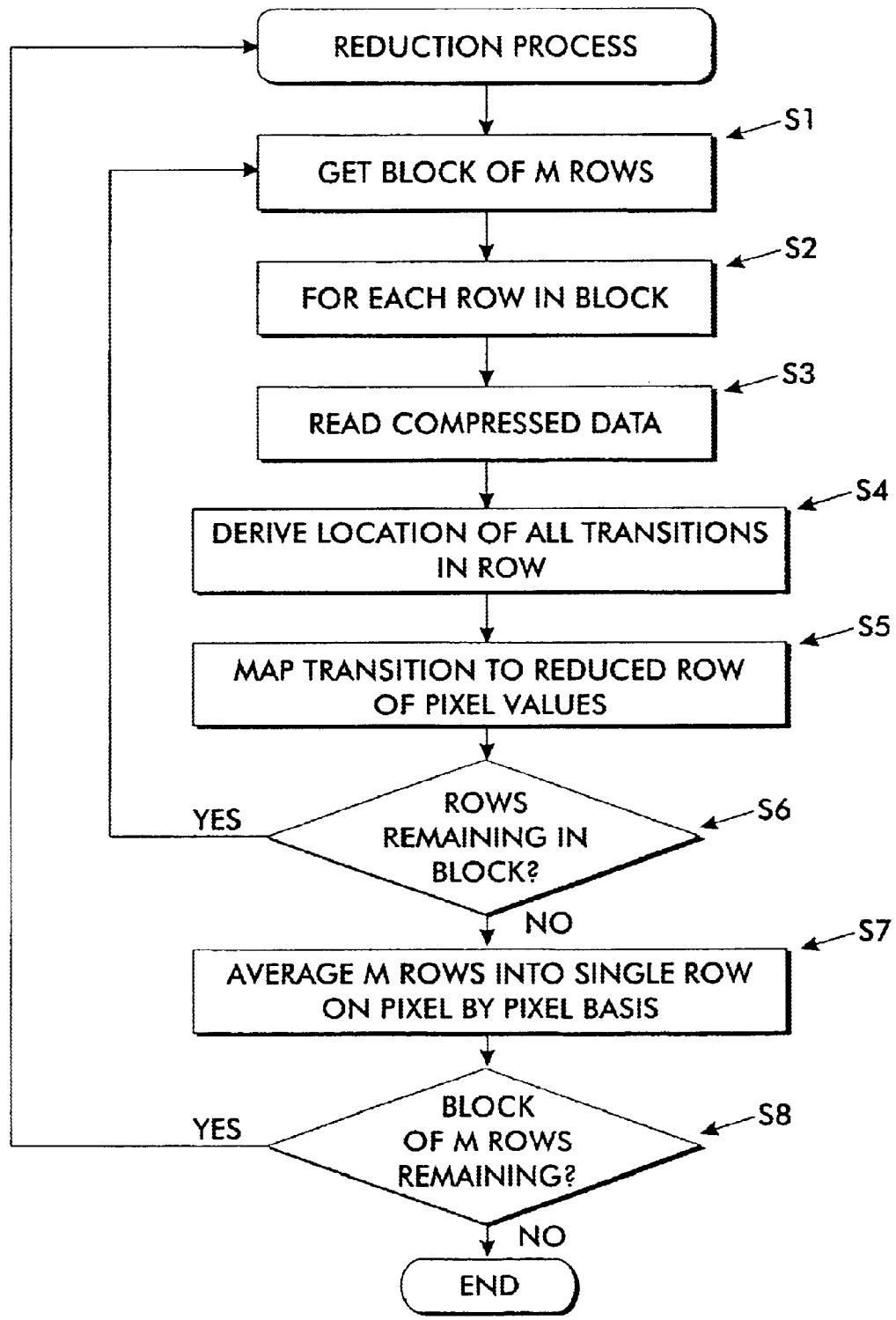
FIG. 8 is a flow chart that discloses a reduction method in accordance with the present invention.

The fast preview method in accordance with the present invention is disclosed in further detail in FIG. 8 wherein the method is disclosed in terms of receiving CCITT-compressed data that define an input image I that has Nr rows and Nc columns, and wherein the image is to be reduced by a factor of M in two dimensions. All processing is carried out without decompressing the CCITT-compressed data. Thus, the resulting uncompressed output image is defined in terms of Nr/M rows and Nc/M columns.

For example, CCITT-compressed data defining an image having a pixel resolution of 600 rows (Nr=600)×600 columns (Nc=600) could be reduced by a factor of M=20 to derive a new reduced image having a pixel resolution of 30 rows×30 columns.

As shown in FIG. 8, a step S1 obtains a block of M rows of the CCITT-compressed data, and a step S2 processes each individual row within the block of M rows. For each row within the block of M rows, a step S3 reads the CCITT compressed data, and a step S4 derives the location of all transitions in the row. As explained in full detail in FIGS. 9 and 10, the step S5 maps the transitions for each row to a reduced row RR—i.e., a row having Nc/M pixels. A step S6 determines if rows remain in the block and, if so, control returns to the step S2. It is understood that different reduction factors can be used along the different axes by simply substituting different factors M1,M2 in place of the factor M, i.e., the resulting uncompressed output image would be defined in terms of Nr/M1 rows and Nc/M2 columns.

After all rows in a group have been reduced by the steps S2–S5, the step S6 passes control to a step S7 that combines the M reduced rows RR into a single preview row to complete the required row reduction operation. In one embodiment, this is accomplished simply by mathematically averaging the rows on a pixel-by-pixel basis to obtain a single reduced row of pixel values. In an alternative embodiment, the M rows are averaged using a logical averaging operation that prevents loss of image data that might occur under certain circumstances using a conventional mathematical averaging operation. For example, if for a given pixel location in each of the M reduced rows RR, all pixels PR have a value 255 except for one that has a value 0, a simple mathematical averaging operation would likely result in loss of the information represented by the 0 value. A logical averaging operation, on the other hand, would result in the information represented by the 0 value pixel being preserved. After the step S7, a step S8 determines if another block of M rows of CCITT-compressed image data remains for processing. If so, control returns to step S1 until all blocks of M rows of CCITT-compressed data have been reduced. If all blocks of M rows have been processed, the reduction process is complete.

Figure 9:
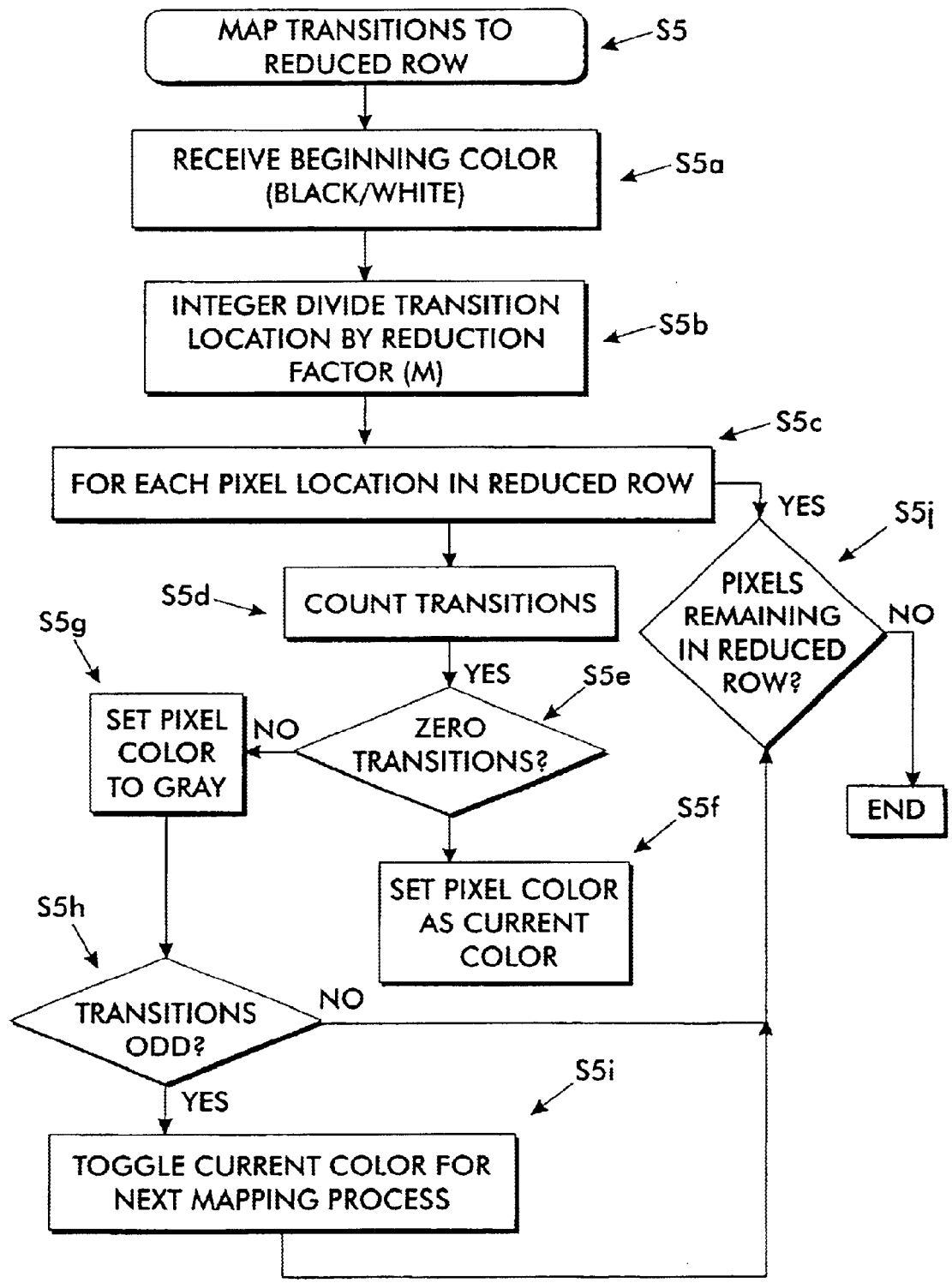
FIG. 9 is a flow chart that discloses a first method for mapping transitions to a pixel value in accordance with the present invention; and, FIG. 10 is a flow chart that discloses a second method for mapping transitions to a pixel value in accordance with the present invention.

A first embodiment of the step S5 for mapping transitions in the transition map TM to a reduced row RR of pixel values PR is disclosed in FIG. 9. A step S5a receives a beginning color which is one of the two possible colors— black and white in the present example. For the first mapping operation of a row, the beginning color is predefined as one of the two possible colors, typically white for black and white image data. In general, the beginning color for each row is the background color of the two possible colors. For subsequent mapping operations in a row, the beginning color received according to the step S5a is the color supplied from the preceding mapping operation. The beginning color is also referred to as the current color.

A step S5b performs an integer division operation of each transition location using the transition pixel location as the dividend and the reduction factor M as the divisor. Those of ordinary skill in the art will recognize that the value resulting from the integer division operation identifies the pixel location or position in the reduced row RR to which the transition relates, i.e., a value between 0 and Nc/M. For example, if the CCITT-compressed data identify a transition at pixel location number 21 of the image I, and if a reduction factor M=20 is used, the step S5b results in output of the value 1 which identifies the second pixel PR of the reduced row RR.

For each pixel location in the reduced row RR as controlled by a step S5c, a step S5d counts the transitions associated with that pixel location. A step S5e determines if zero transitions are associated with the pixel location. If so, a step S5f assigns the current color as the pixel value to the relevant pixel location PR in the reduced row RR and control passes to step S5j that determines in pixels remain in the reduced row. If so, control returns to step S5c; if no pixels remain in the reduced row, the mapping process for the subject row is complete.

If the number of transitions is non-zero according to the step S5e, a step S5g sets the color of the relevant pixel in the reduced row to gray to account for the existence of both colors in the data associated with the relevant pixel PR in the reduced row RR. Gray is preferably defined as the numerical midpoint in the dynamic range separating the two possible colors, although other gray values may be used without departing from the overall scope and intent of the present invention.

A step S5h determines if the number of transitions associated with the relevant pixel location PR in the reduced row RR is odd. If not, control passes to step S5j for processing of the next pixel location in the reduced row if pixels remain. On the other hand, if the step S5h determines that the number of transitions is odd, a step S5i toggles the current color for the next mapping process before control passes to step S5j. This toggling operation S5i does not affect the color of the present pixel PR in the reduced row RR. Instead, the new current color is used in the step S5f, if necessary, for the next pixel location in the reduced row.

Figure 10:
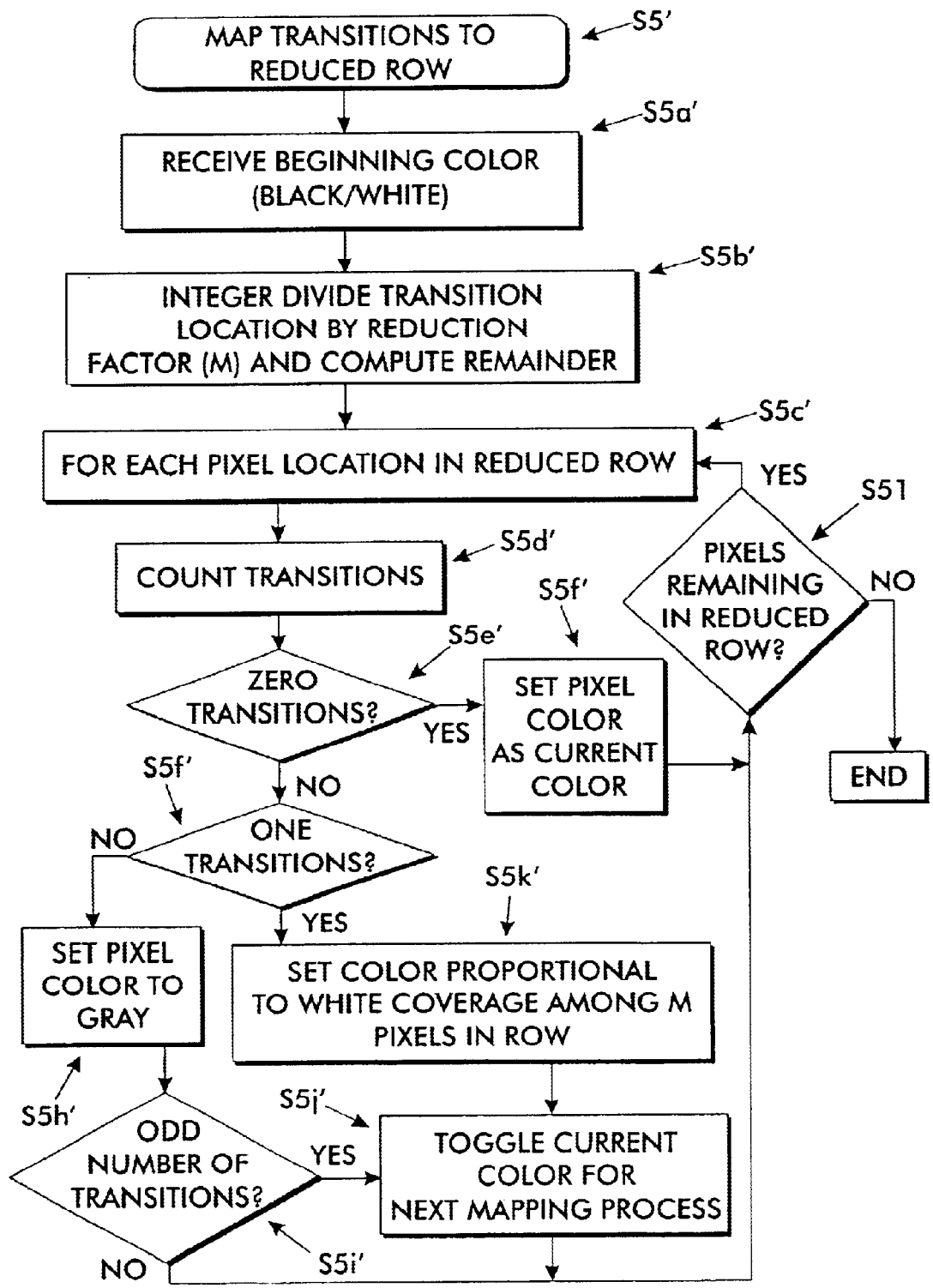

An alternative method for mapping transitions to pixel values in the reduced row is disclosed at S5' in FIG. 10. In a step S5a' the beginning color is received. As noted above, the beginning color is also referred to as the current color. The step S5b' comprises performing an integer division of each transition location using the reduction factor M as the divisor. The step S5b' also computes the remainder of the division operation.

For each pixel location PR in the reduced row RR as controlled by the step S5c', a step S5d' counts the transitions associated therewith. A step S5e' determines if the number of transitions is zero and, if so, a step S5f' assigns the current color for the pixel location PR and control passes to step S5l' that determines if pixels remain in the reduced row. If so, control returns to step S5c'. Otherwise, the mapping process is complete.

If the step S5e' determines that the number of transitions in non-zero, a step S5g' determines if only one transition is associated with the relevant pixel location PR. If more than one transition is found by the step S5g' a step S5h' is carried out to set the color of the relevant pixel PR to gray as defined above. A step S5i' then determines if the number of transitions is odd. If the number of transitions is not odd, control passes to step S5l'; if the number of transitions is odd, a step S5j' is carried out to toggle the current color for the next mapping operation and control then passes to step S5l'.

If the step S5g' determines that only one transition occurs in the image data associated with the relevant pixel PR in the reduced row RR, a step S5k' is carried out to set the color of the pixel in the reduced row to a gray value that varies in proportion to the white coverage among the M pixels P of the image I associated with the pixel PR in the reduced row RR. Specifically, if one transition is present, the step S5k' uses the remainder calculated in step S5b' to determine where among the M pixels P associated with the relevant pixel PR in the reduced row RR the transition occurs. If the step S5k' determines if the M pixels P are more white than black (because a transition from white to black occurs late among the M pixels or a transition from black to white occurs early among the M pixels), the relevant pixel PR in the reduced row RR is set to have a gray value that is closer to white. If the step S5k' determines that the opposite is true, i.e., the M pixels are more black than white (because a transition from black to white occurs late among the M pixels or a transition from white to black occurs early among the M pixels), the relevant pixel in the reduced row is set to have a gray value that is closer to black. Control then passes to step S5j' where the current color is toggled for use in the next mapping operation, after which control passes to step S5l' for processing of the next pixel PR in the reduced row RR.

Those of ordinary skill in the art will recognize from the foregoing that the CCITT-compressed data are not decompressed to derive the preview image. Instead, the CCITT-compressed data are used directly to determine transition locations in each row R of an original image I. Each transition is associated with one of the pixels PR in the reduced row RR. The value of each pixel in the reduced row is based upon the number and, optionally, the location of the transitions in the row of the original image I. Finally, a single preview row of pixel values is derived from each group of M reduced rows RR so that the original image I is reduced by a factor of M in two dimensions without decompressing the CCITT-compressed data.

Modifications and alterations will occur to those of ordinary skill in the art to which the invention pertains upon reading and understanding this specification. It is intended that the invention be construed as including all such modifications and alterations insofar as they are encompassed by the following claims as construed literally or in accordance with the doctrine of equivalents.

Having thus described the preferred embodiments, what is claimed is:

1. A method of deriving a preview image from CCITT-compressed digital image data that represent an original image, said method comprising:

receiving CCITT-compressed image data that represent an original image having Nr rows and Nc columns whereby said original image has a resolution of Nr×Nc;

reducing said image by factors of M1 and M2 to derive a preview image having Nr/M1 preview rows each having Nc/M2 pixel values whereby said preview image has a resolution of Nr/M1×Nc/M2, said reducing step comprising, for each group of M1 rows of said original image:

reading the CCITT-compressed data that represent said group of M1 rows of said original image;

for each constituent row in said group of M1 rows, deriving a location in said row for each transition represented in said CCITT-compressed data;

for each row in said group of M1 rows, mapping each transition in said row to a pixel value in a reduced row having Nc/M2 pixel values whereby M1 reduced rows are defined; and, deriving a single preview row having Nc/M2 preview pixel values based upon said M1 reduced rows.

2. The method as set forth in claim 1, wherein said step of deriving a single preview row having Nc/M2 preview pixel values based upon said M1 reduced rows comprises:

combining said M1 reduced rows together on a pixel-by-pixel basis to derive said preview row whereby said preview row comprises Nc/M2 preview pixel values with each of said preview pixel values based upon all correspondingly located pixel values in said M1 reduced rows.

3. The method as set forth in claim 2, wherein said step of combining said M1 reduced rows comprises mathematically averaging said correspondingly located pixel values in said M1 reduced rows for each of said Nc/M2 preview pixel values.

4. The method as set forth in claim 1, wherein said step of mapping each transition in said row to a pixel value in a reduced row comprises:

associating each of said transitions in said row with one of said Nc/M2 pixel values in said reduced row;

counting a number of transitions associated with each of said Nc/M2 pixel values in said reduced row;

determining a beginning value for each of said Nc/M2 pixel values in said reduced row; and, adjusting the beginning value for each of said Nc/M2 pixel values in said reduced row based upon the number of transitions associated with each of said Nc/M2 pixel values.

5. The method as set forth in claim 4, wherein said step of associating each of said transitions in said row with one of said Nc/M2 pixel values in said reduced row comprises:

performing an integer division operation of each of said transition locations using said factor M2 as a divisor; and, using a result of each of said integer division operations to identify a pixel value location in said reduced row.

6. The method as set forth in claim 4, wherein said step of adjusting the beginning value for each of said Nc/M2 pixel values in said reduced row further comprises:

determining if only one transition is associated with each of said Nc/M2 pixel values; and, for each of said Nc/M2 pixel values with which only one transition is associated, adjusting said pixel value depending upon said location of said one transition in said row and a direction of said transition.

7. The method as set forth in claim 1, wherein said factors M1 and M2 are equal.

8. A digital image processing method comprising:

receiving CCITT-compressed data that represent a row of an uncompressed binary image having Nc pixel values;

processing said CCITT-compressed data in the compressed to derive all locations in said row of uncompressed binary image data where color transitions occur;

associating each transition location with one of Nc/M reduced pixel values that define a reduced row, where M represents a reduction factor by which said row of said uncompressed binary image is reduced;

determining, according to said transition locations, a quantity of transitions associated with each of said Nc/M reduced pixel values;

adjusting a value of each of said Nc/M reduced pixel values of said reduced row depending the quantity of transitions associated therewith.

9. The digital image processing method as set forth in claim 8, wherein said step of associating each of said transition locations to one of said Nc/M reduced pixel values comprises:

assigning each of said transition locations to one of said Nc/M reduced pixel values according to a result of an integer division operation using the transition location as a dividend and the reduction factor M as the divisor.

10. The digital image processing method as set forth in claim 9, wherein said step of adjusting further comprises, for each of said reduced pixel values:

determining if only one transition is associated with said reduced pixel value;

if only one transition is associated with said reduced pixel value, determining a location and direction of said one transition in a group of Nc/M uncompressed pixel values associated with said reduced pixel value to determine a white coverage value; and, adjusting said reduced pixel value depending upon said white coverage value.

11. The digital image processing method as set forth in claim 10, wherein said step of determining a location and direction of said one transition comprises:

determining a remainder of said integer division operation; and, using said remainder to locate said location of said one transition among said group of Nc/M uncompressed pixel values.

12. A method of processing digital image data in a CCITT-compressed domain in a xerographic or printing environment to derive a preview image of an original image represented by the CCITT-compressed data, said method comprising:

reading CCITT-compressed data that represent an original uncompressed image;

for each row of said uncompressed image represented in said CCITT-compressed data, developing a transition map that describes locations in said row where a color transition occurs;

assigning each of said transition locations to one of a plurality of reduced pixel value locations in a reduced row;

counting a quantity of transitions associated with each of said reduced pixel value locations in said reduced row;

setting a color value for each of said reduced pixel value locations in said reduced row based upon at least said quantity of transitions associated therewith;

combining a plurality of reduced rows to derive a single preview row of preview pixel values;

generating a preview image defined by a plurality of preview rows.

13. The digital image processing method as set forth in claim 12, wherein:

said uncompressed image has Nr rows and Nc columns of pixel values;

said preview image represents said uncompressed image as reduced by a factor of M is two dimensions whereby each of said reduced rows has Nc/M reduced pixel values and said preview image has Nr/M rows and Nc/M columns of preview pixel values; and, said step of combining a plurality of reduced rows comprises combining M reduced rows.

14. The digital image processing method as set forth in claim 13, wherein said step of combining M reduced rows comprises, for each pixel location in said M reduced rows, averaging said reduced pixel values of said M reduced rows to derive a preview pixel value.

15. The digital image processing method as set forth in claim 12, wherein said step of setting a color value for each of said reduced pixel value locations further comprises:

determining if only one transition is associated with a reduced pixel value location;

if only one transition is associated with a reduced pixel value location, assigning said reduced pixel value location a gray value that is dependent upon a white coverage value associated with said one transition.

* * * * *